United States Patent Office 3,623,920
Patented Nov. 30, 1971

3,623,920
METHOD FOR PRODUCING A STAINLESS STEEL RESISTIVE TO HIGH TEMPERATURE AND NEUTRON IRRADIATION
Tatsuo Kondo and Toshihiko Kikuyama, Tokaimura, and Ryukichi Nagasaki, Mito-shi, Japan, assignors to Japan Atomic Energy Research Institute, Tokyo, Japan
Filed Mar. 17, 1969, Ser. No. 807,528
Int. Cl. C21d 1/80
U.S. Cl. 148—12.3                  1 Claim

ABSTRACT OF THE DISCLOSURE

By subjecting a stainless steel of AISI 300 series to cold working of at least 10 percent, and a strain aging at 500° C.–800° C., and then to recrystallization treatment at 650° C.–950° C., a stainless steel has been obtained that has high-temperature yield strength approximately twice that of the conventional austenite steel of the same composition, is resistant to embrittlement due to high temperature reactor irradiation, and yet retains ductility and microstructure stability.

BACKGROUND OF THE INVENTION

This invention relates to thermomechanical treatment of austenite stainless steel for providing a stainless steel material that is resistive to high temperature and neutron irradiation. More particularly, this invention relates to a process for manufacturing a stainless steel suitable for use in nuclear reactors, which is remarkably resistant to embrittlement at high temperature caused by irradiation of neutrons, and is provided with improved mechanical properties at high temperature and stability thereof which are desirable in use of the steel for nuclear reactors, said process comprising subjecting a class of austenite stainless steels other than those of the stabilized carbide type, that is, steels of AISI No. 301 through 317 to a specific treatment combining strain aging and recrystallization.

The stainless steel provided by this invention is especially suitable for use in fast neutron breeders (breeder reactors); accordingly this invention will make a remarkable contribution not only to the steel making industry, especially manufacture of stainless steel tubings, but also to the field of manufacture of nuclear fuels.

Although the techniques for manufacturing stainless steel as the material for use in the general chemical industries have long been established, techniques for manufacturing stainless steel materials for use in fast neutron breeders are still in the primary stage in a worldwide sense. In the prior art of stainless steel making, primarily corrosion resistance was aimed at, and therefore, the steel was supplied in the austenitic state, that is, in the state of solid solution, and cold working was depended upon for improving yield strength of the steel at high temperature. In such prior art, however, ductility of the steel was sacrificed. Strength based on cold working could not be retained at high temperatures and instability of mechanical properties of the steel was a problem.

Moreover, stainless steels of the prior art have a fatal defect in that toughness is drastically reduced by irradiation of neutrons at high temperature, and therefore are not so useful as the material for fast neutron breeders and other kinds of high temperature nuclear reactors.

This invention overcomes the above-mentioned defects of the prior art and provides a stainless steel that is suitable for use in nuclear reactors, especially breeders.

Embrittlement of the steel by irradiation of neutrons is believed to be caused by gaseous phase fission products which are produced as the result of nuclear reactions induced by neutron irradiation and diffuse to form bubbles at the grain boundaries, particularly at the boundaries of precipitated carbides. One of the means hitherto proposed for lessening embrittlement by neutron irradiation was to coarsen the carbide particles. But, to the contrary, the present inventors found that embrittlement of the stainless steel is diminished by obtaining fine uniformly distributed carbide grains.

SUMMARY OF THE INVENTION

The object of this invention is to manufacture a stainless steel that has high-temperature yield strength approximately twice that of the conventional stainless steel of the same composition, and is resistant to embrittlement due to high-temperature reactor irradiation, and yet retains ductility and microstructural stability.

The object of this invention is accomplished by subjecting a steel selected from a class of stainless steels of AISI No. 301 through 317 to cold working of at least 10 percent, and then heating it at a temperature between 500° C. and 800° C. until the carbide phase is precipitated, and thereafter, heating it at a temperature between 650° C. and 950° C., said temperature being higher than said precipitation temperature, until recrystallization of the martix is effected.

The class of stainless steels represented by AISI No. 301 through No. 317 cover the following composition range:

| Element: | Weight percent | |
|---|---|---|
| | Minimum | Maximum |
| Cr | 16.0 | 26.0 |
| Ni | 6.0 | 22.0 |
| Mo | 0 | 4.0 |
| C | 0 | 0.25 |
| Si | 0 | 3.0 |
| Mn | 0 | 2.0 |
| P | 0 | 0.20 |
| S | 0 | 0.06 |
| N | 0 | 0.25 |
| Fe | Balance | |

The steel of this class does not contain titanium, niobium and/or tantalum; it contains only chromium as the principal carbide former and molybdenum is not potential carbide former. Therefore, all the steels in this class behave in the same way in the carbide precipitation heat treatment. This is well known to those who are skilled in the art, and thus it will be understood that the process of this invention is generally applied to any steel of said class.

The steel is first subjected to cold working of at least 10%, for instance cold rolling with at least 10% reduction. In order to attain good uniform distribution of carbide precipitates and proper degree of recrystallization by the recrystallization treatment under practical time and temperature conditions as specified before, cold working of at least 10% is requisite, and degree of cold working as high as possible is desirable. However, degree of cold working will be limited by work hardening. This difficulty will be avoided by repeating cold working and strain relief tempering. That is, the once cold-worked steel is tempered at a temperature and time at which neither carbide precipitation nor recrystallization occurs so as to remove up to 50% of work hardening caused by the cold working, and the working and the strain relief are repeated.

Then the steel that has undergone said cold working is subjected to heat treatment at a temperature between 500° C. and 800° C. for a period sufficient to effect precipitation of chromium carbides ($Cr_{23}C_6$, $Cr_6C$, etc).

The thus treated steel is, then, subjected to recrystallization heat treatment. The steel which has undergone the precipitation treatment can either be directly or continuously passed to the recrystallization heat treatment or it can be cooled once before being passed to the recrystallization treatment, whereby the rate of cooling has nothing to do with the effect of this invention; that is, the steel can be quenched or slow-cooled.

The recrystallization is carried out at a temperature between 650° C. and 950° C., but higher than said precipitation temperature for a period sufficient to effect recrystallization of desirable grain size. Rate of cooling after recrystallization has nothing to do with the effect, either.

Anyway, after it is ascertained that desired precipitation of carbides has been effected, the steel is passed to the recrystallization treatment. Of course precipitation and recrystallization may occur overlappingly. However, we must see to it that carbide precipitation may occur in advance to recrystallization, and this is assured by employing a precipitation temperature lower than the recrystallization temperature.

The recrystallization heat treatment must be carried out under the condition that no redissolution of once-precipitated carbide particles occurs.

The temperatures of precipitation treatment and recrystallization treatment are selected by considering the size of the steel articles or material to be treated, apparatuses for treatment, economy in operation, degree of cold working and many other factors pertaining to the treatments.

Stainless steel manufactured in accordance with this invention is provided with the following mechanical properties. High-temperature toughness and tensile strength of the steel are of the same level as or higher than those of the ordinary stainless steel of solid solution state having the same composition, but yield strength of the steel of this invention is more than twice that of the ordinary stainless steel, and the mechanical properties of this steel are not degraded even after prolonged exposure to high temperature. The steel of this invention is far less embrittled when it is irradiated with thermal and fast neutron flux at high temperatures.

BRIEF EXPLANATION OF THE DRAWINGS

Now the invention is more specifically explained by way of working examples, the attached drawings being referred to.

DETAILED DESCRIPTION OF THE INVENTION.—
EXAMPLE 1

Test pieces, 2 mm. in thickness, 4 mm. in width, 30 mm. in gauge length and 90 mm. in whole length, of an AISI 316 steel having the following composition were cold-rolled respectively to reduction of 10%, 30%, 50%, 70%, 91% and 98%.

|    | Wt. percent |
|----|----|
| Cr | 16.40 |
| Ni | 13.00 |
| Mo | 2.22 |
| C  | 0.05 |
| Si | 0.56 |
| Mn | 1.66 |
| P  | 0.025 |
| S  | 0.009 |
| B  | 0.0009 |
| N  | 0.025 |
| Fe | Balance |

The cold-worked specimens were subjected to precipitation heat treatment at 550° C., 600° C., 650° C., 700° C., 770° C. and 800° C., and progress of carbide precipitation was checked by electron microscope observation of carbide extraction replicas and thin foils of each specimen.

Then the specimens were subjected to recrystallization heat treatment at the temperatures of 650° C., 680° C., 684° C., 700° C., 710° C., 712° C., 727° C., 747° C., 750° C., 780° C., 790° C., 820° C., 850° C., 890° C., 900° C., and the progress of recrystallization was observed and analyzed by means of direct transmission electron microscopy, X-ray diffraction, polarized light microscopy, and micro hardness measurement at intervals of 45–150° seconds. Completion of recrystallization was judged by confirming dislocation configuration by electron microscope.

The thus treated specimens were subjected to tensile testing at elevated temperatures (600° C.).

Also the specimens thermomechanically treated in accordance with this invention were subjected to irradiation of thermal neutrons of $5 \times 10^{19}$ nvt and fast neutrons of $2 \times 10^{20}$ nvt in the incore irradiation apparatus of JRR–2 (Japan Research Reactor No. 2) at 460° C., and thereafter to tensile test at 750° C. The results are shown in Table 2 in comparison with the results with respect to the materials of the prior art.

Figure 1:
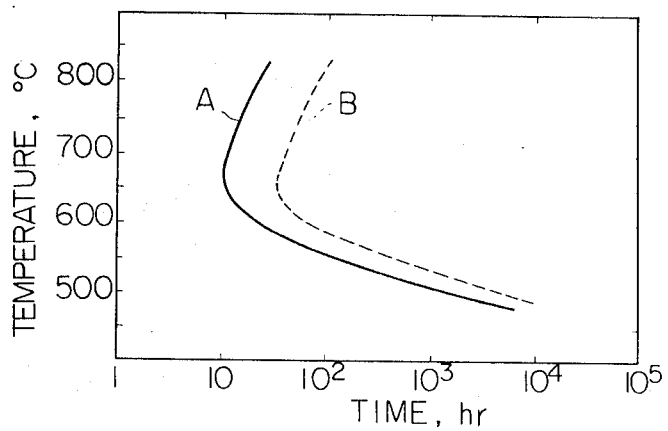
FIG. 1 shows the relation between degree of cold working and time and temperature of carbide precipitation pertaining to an AISI 316 steel.

The relation between degree of cold working and temperature and time of carbide precipitation treatment is shown in FIG. 1. Curve A represents the relation when the specimen was 70% cold-rolled and underwent the heat treatment until 50% precipitation was achieved. Curve B represents the relation when the specimen was 10% cold-rolled and underwent the heat treatment until 50% precipitation was achieved.

As seen in the figure, the higher the degree of cold working is the faster the precipitation takes place. In order to attain a practical precipitation rate, at least 10% cold working is necessary. With about 10% precipitation, necessary number of nuclei of precipitation is achieved and it is not necessary to attain a high degree of precipitation by spending much time. Every curve has a nose at about 650° C. It is needless to say that this is a most convenient temperature.

Figure 2:
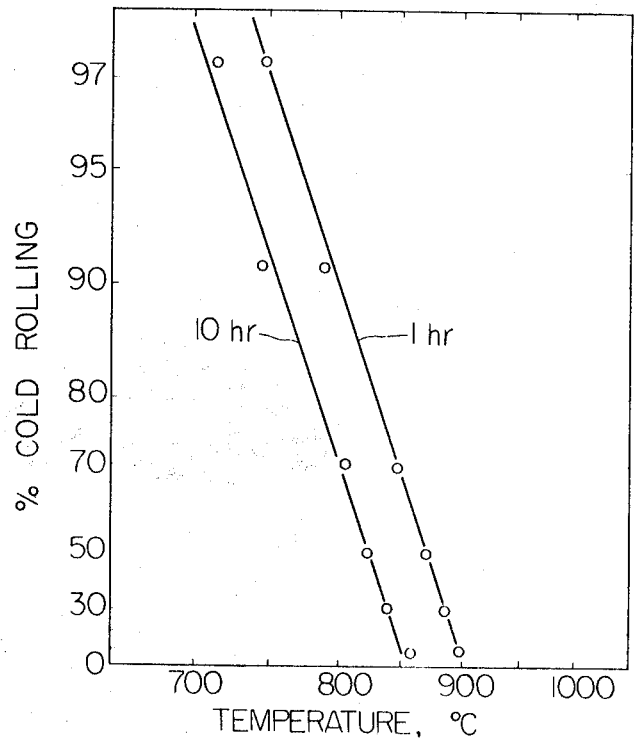
FIG. 2 shows the relation between degree of cold working and time and temperature of recrystallization pertaining to an AISI 316 steel.

The relation between degree of cold working and time and temperature of recrystallization is shown in FIG. 2.

Each of the oblique lines represents time required for completion of recrystallization as indicated in the figure. Between the time for completion of recrystallization and the temperature, there is a relation that as the temperature increases by 50° C., the time decreases to one tenth. Also the diagram shows that the higher the degree of cold working is, the faster the recrystallization proceeds.

Figure 3:
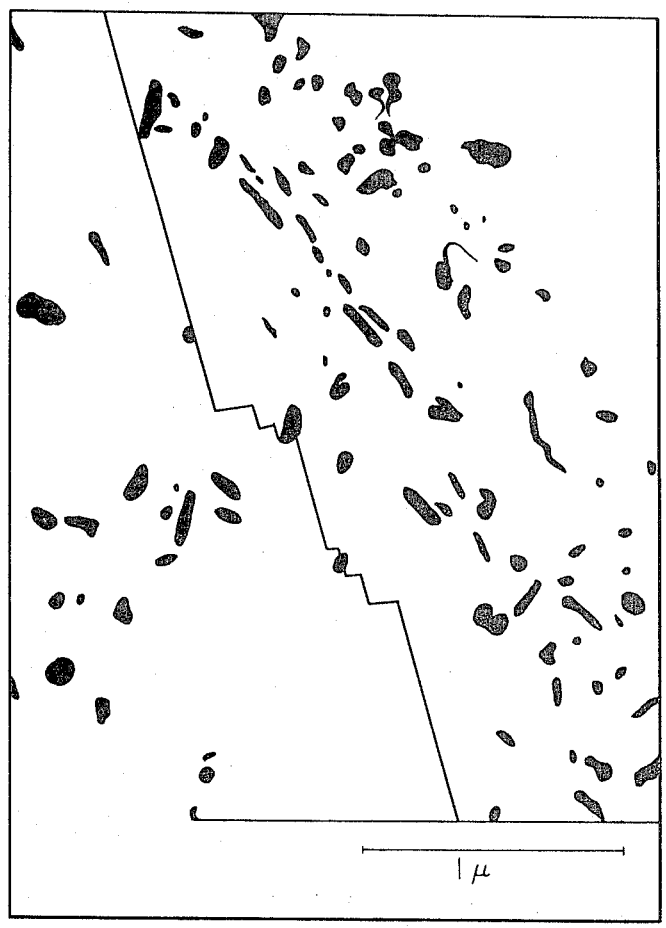
FIG. 3 shows microscopic structure of an AISI 316 steel treated in accordance with this invention under the typical conditions thereof.

FIG. 3 shows a typical microstructure of the steel of Example 1. This is a microphotograph taken by direct transmission electron microscopy of a specimen which was 70% cold-rolled, heated at 650° C. for 48 hours, and then heated at 780° C. for 48 hours. The black spots are carbides.

The results of the tensile test at 600° C. are summarized in Table 1 together with the data of the same tests pertaining to AISI–308 and AISI–304 steels dealt with in Examples 2 and 3.

EXAMPLE 2

The same experiment as Example 1 was carried out with respect to an AISI 308 steel. Analysis of the specimen is as follows:

|    | Wt. percent |
|----|-------------|
| Cr | 19.50 |
| Ni | 11.00 |
| Mo | 0.06 |
| C  | 0.05 |
| Si | 0.60 |
| Mn | 1.62 |
| P  | 0.025 |
| S  | 0.008 |
| B  | 0.0007 |
| N  | 0.029 |
| Fe | Balance |

TABLE 1

| Sample | Degree of cold rolling | Condition of carbide precipitation | Recrystallizing condition | Yield strength, 600° C. (kg./mm.²) | Ultimate tensile strength, 600° C. (kg./mm.²) | Elongation, 600° C. (percent) |
|---|---|---|---|---|---|---|
| AISI 316: | | | | | | |
| Example 1 | 70% | 650° C., 48 hr | 840° C., 1 hr | 21.5 | 40.5 | 42 |
|  | 50% | 650° C., 72 hr | 865° C., 1 hr | 17.5 | 42 | 42 |
|  | 30% | 650° C., 96 hr | 880° C., 1 hr | 15.5 | 41 | 40 |
|  | 10% | 650° C., 140 hr | 900° C., 1 hr | 13.0 | 41.5 | 40 |
| Control | Conventional | | 1,100° C., 7 min.→W.Q. | 10.5 | 43 | 38 |
|  | 70% | | As rolled | 50.5 | 60 | 6 |
| AISI 308: | | | | | | |
| Example 2 | 70% | 650° C., 48 hr | 835° C., 1 hr | 21 | 41 | 37 |
|  | 50% | 650° C., 72 hr | 865° C., 1 hr | 17 | 40.5 | 37 |
|  | 30% | 650° C., 96 hr | 875° C., 1 hr | 14.5 | 40.5 | 40 |
|  | 10% | 650° C., 140 hr | 900° C., 1 hr | 13.0 | 42 | 38 |
| Control | Conventional | | 1,100° C., 7 min.→W.Q. | 10 | 42 | 38 |
|  | 70% | | As rolled | 50.5 | 60 | 6 |
| AISI 304: | | | | | | |
| Example 3 | 70% | 650° C., 48 hr | 830° C., 1 hr | 18.5 | 40 | 40 |
|  | 50% | 650° C., 72 hr | 855° C., 1 hr | 15 | 42 | 38 |
|  | 30% | 650° C., 96 hr | 880° C., 1 hr | 13.5 | 40.5 | 40 |
|  | 10% | 650° C., 140 hr | 900° C., 1 hr | 11 | 40 | 40 |
| Control | Conventional | | 1,100° C., 7 min.→W.Q. | 9 | 42 | 38 |
|  | 70% | | As rolled | 50 | 61 | 6 |

The results of the post irradiation testing are summarized in Table 2 together with the results of Examples 2 and 3.

The results of the tensile test are summarized in Table 1. The results of the irradiation tett are summarized in Table 2.

TABLE 2

Irradiated by:
2×10²⁰ nvt fast neutrons
and
5×10¹⁹ nvt thermal neutrons
at
460° C.
Tensile tested at 750° C.
Strain rate=0.007/min.

| Sample | Preirradiation heat treatment | Yield strength (750° C.) kg./mm.² | Ultimate tensile strength (750° C.) kg./mm.² | Elongation (750° C.) percent |
|---|---|---|---|---|
| AISI 316: | | | | |
| Example 1 | 70% C.W.→650° C., 48 hrs. C.P.→780° C., 48 hrs. R.C. | 12.5 | 12.8 | 29 |
| Conventional (control) | 1,100° C., 7 min.→W.Q. | 8.5 | 12.3 | 12 |
| AISI 308: | | | | |
| Example 2 | 70% C.W.→650° C., 48 hrs. C.P.→780° C., 48 hrs. R.C. | 12.2 | 12.5 | 27 |
| Conventional (control) | 1,100° C., 7 min.→W.Q. | 8.8 | 12.5 | 10 |
| AISI 304: | | | | |
| Example 3 | 70% C.W.→650° C., 48 hrs. C.P. | 7 | 8 | 25 |
| Conventional (control) | →780° C. 48 hrs. R.C., 1,100° C., 7 min.→W.Q. | 5.5 | 7.9 | 9.59 |

NOTE.—C.W.=Cold Working; C.P.=Carbide Precipitation; R.C.=Recrystallation; W.Q.=Water Quench.

EXAMPLE 3

The same experiment as Example 1 was carried out with respect to an AISI 304 steel. Analysis of the specimen is as follows:

Chemical analysis of the specimen:

| | Wt. percent |
|---|---|
| Cr | 18.80 |
| Ni | 9.20 |
| Mo | 0.06 |
| C | 0.05 |
| Si | 0.62 |
| Mn | 1.50 |
| P | 0.024 |
| S | 0.009 |
| B | 0.0007 |
| N | 0.034 |
| Fe | Balance |

The results of the tensile test are summarized in Table 1.

The results of the irradiation test are summarized in Table 2.

Repeated observations and analyses revealed the following facts. As the total degree of working increases, the aging based chiefly on precipitation of carbides occurs more rapidly and more effectively, and recrystallization proceeds more rapidly at lower temperatures and grain size of crystals is reduced.

What we claim is:

1. A method for producing a stainless steel that has high-temperature yield strength approximately twice that of the conventional stainless steel of the same composition, and is resistant to embrittlement due to high-temperature reactor irradiation, and yet retains ductility and microstructural stability at high temperature comprising subjecting a steel selected from a class of AISI No. 301 through 317 to cold working of at least 10 percent, and then heating it at a temperature between 500° C. and 800° C. until carbide phase is precipitated, and thereafter, heating it at temperature between 650° C. and 950° C., said temperature being higher than said precipitation temperature, until recrystallization of the matrix is effected.

References Cited
UNITED STATES PATENTS

| | | | |
|---|---|---|---|
| 2,027,554 | 1/1936 | Schafmeister et al. | 148—12.3 |
| 3,347,715 | 10/1967 | Pfeil | 148—12.3 |
| 3,437,477 | 4/1969 | McCune | 148—12.3 |
| 3,473,973 | 10/1969 | Maekawa et al. | 148—12.3 |

L. DEWAYNE RUTLEDGE, Primary Examiner

W. W. STALLARD, Assistant Examiner

U.S. Cl. X.R.

148—142

PO-1050
(5/69)

UNITED STATES PATENT OFFICE
CERTIFICATE OF CORRECTION

Patent No. 3,623,920          Dated Nov. 30, 1971

Inventor(s) Tatsuo Kondo et al

It is certified that error appears in the above-identified patent and that said Letters Patent are hereby corrected as shown below:

In Col. 1, after "Filed Mar. 17, 1969, Ser.No. 807,528" insert the following line:-

Claims priority, Japanese application No. 17515/1968, filed March 19, 1968

Signed and sealed this 25th day of April 1972.

(SEAL)
Attest:

EDWARD M. FLETCHER, JR.          ROBERT GOTTSCHALK
Attesting Officer                 Commissioner of Patents